(12) United States Patent
Nakahata (10) Patent No.: US 7,199,913 B2
(45) Date of Patent: Apr. 3, 2007

(54) CURVED SUPPORT FOR MIRROR IN OPTICAL SCANNING DEVICE

(75) Inventor: Hiroshi Nakahata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 11/143,732

(22) Filed: Jun. 3, 2005

(65) Prior Publication Data

US 2005/0274881 A1    Dec. 15, 2005

(30) Foreign Application Priority Data

Jun. 4, 2004    (JP)    ............................... 2004-166900

(51) Int. Cl.
*G02B 7/185*    (2006.01)

(52) U.S. Cl. .................................................... 359/198

(58) Field of Classification Search ........ 359/196–226, 359/871; 347/222–233, 242–245, 257–261
See application file for complete search history.

(56) References Cited

U.S. PATENT DOCUMENTS 2,976,361 A * 3/1961 Stamps ...................... 358/494
5,923,482 A * 7/1999 Gilby .......................... 359/846
6,756,583 B2 * 6/2004 Yamawaki .................. 250/234

FOREIGN PATENT DOCUMENTS

| GB | 2152701 A | * | 8/1985 |
| JP | 8-146325 | | 6/1996 |
| JP | 10-268217 | | 10/1998 |
| JP | 2001-117040 | | 4/2001 |

* cited by examiner

*Primary Examiner*—Tarifur Chowdhury
*Assistant Examiner*—Jennifer Doak
(74) *Attorney, Agent, or Firm*—Fitzpatrick, Cella, Harper & Scinto (57) ABSTRACT

An optical apparatus comprises a first image bearing member; a second image bearing member; a first reflection member for reflecting a deflection-scanned first laser beam toward the first image bearing member; a second reflection member for reflecting a deflection-scanned second laser beam toward the second image bearing member; and a curving support member for curving, in a reflection direction, a reflection surface of the first reflection member, which reflects the first laser beam. The curving support member includes a support portion which supports a surface on the side of a direction in which the first reflection member curves, a contact portion of the support portion with respect to the first reflection member is of a shape having a curvature.

8 Claims, 7 Drawing Sheets

CURVED SUPPORT FOR MIRROR IN OPTICAL SCANNING DEVICE

BACKGROUND OF THE INVENTION (a) Field of the Invention

The present invention relates to an optical apparatus which deflection-scans light emitted from a light source using a rotary polygon mirror and reflects the light by a recording material and irradiates the same, and the invention also relates to an image forming apparatus such as an electrophotographic copying machine and a printer.

(b) Description of the Related Art

A recent electrophotographic type copying machine or printer converts image information into a digital signal, irradiates a photosensitive drum charged by a charger by means of a scanning type optical apparatus with light based on the signal, thereby forming an electrostatic latent image, and forms the electrostatic latent image into a visible image as a toner image by a development unit.

The scanning type optical apparatus deflection scans light emitted from a light source by a rotary polygon mirror which is a deflection-scanning means, reflects the light by a reflection mirror, thereby irradiates a photosensitive drum disposed at a predetermined position with the light. At that time, in the case of the scanning type optical apparatus in which the reflection mirror is disposed in the vicinity of the photosensitive drum, the optical apparatus is influenced by surface precision of a surface of the reflection mirror, and a curve is generated in a scanning line on the photosensitive drum.

In the case of a system which scans laser beam emitted from the same laser light-emitting source on a single photosensitive drum, for both monochrome image and a color image, even if a slight curve is generated in the scanning line, since the scanning is carried out with the same characteristics, deviation is not generated on the photosensitive drum, and a problem that this curve deteriorates an image quality is not caused so much.

However, in the case of an image forming apparatus which scans a plurality of drums to form a color image, since light passes through different optical elements and is reflected and different photosensitive drums are irradiated with the light, each color has different curved profile of the scanning line. In that case, when colors are superposed on an image, the scanning lines are not superposed and colors are deviated, and this deteriorates the image quality.

Figure 6:
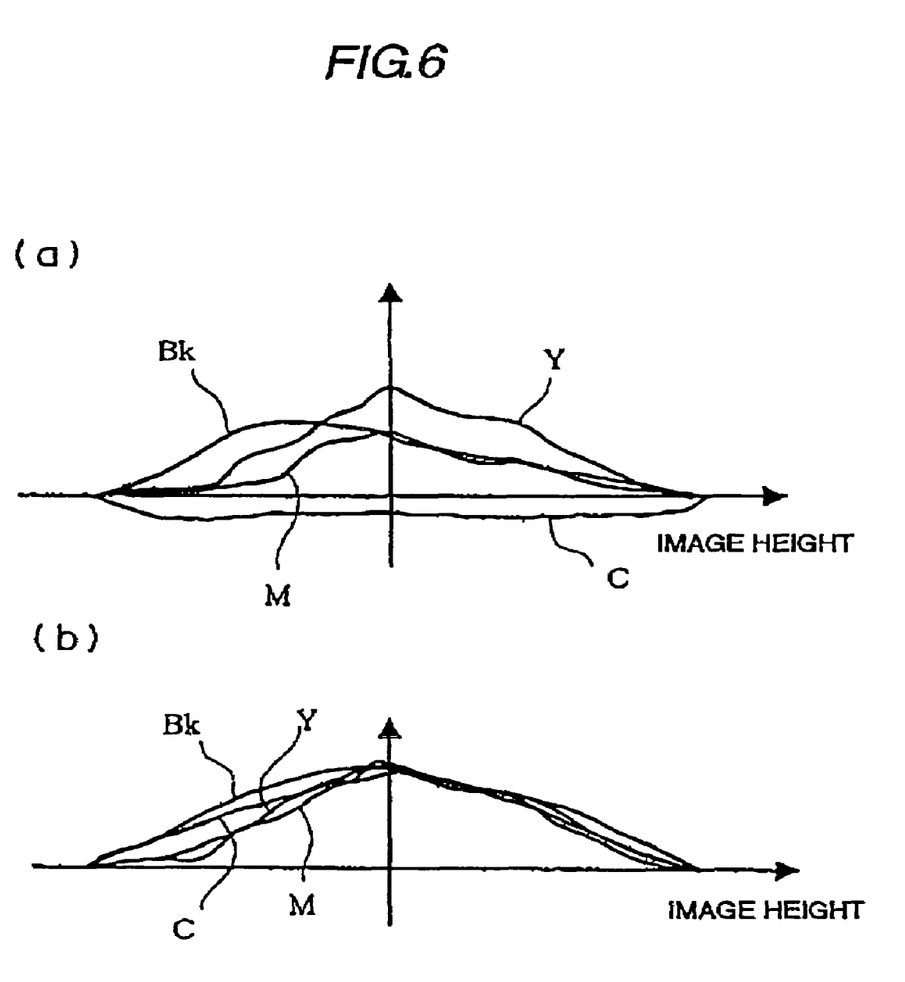

FIG. 6(a) shows one example of the color deviation. A lateral axis shows image heights of yellow (Y), magenta (M), cyan (C), black (Bk) which form a color image, and a vertical axis shows an irradiation position on each drum. When the scanning line is not curved, the light source has a straight profile. However, in the case of the scanning type optical apparatus which scans a plurality of photosensitive drums, a degree of the curve and profile are varied as described above and as shown in the drawing, and the color deviation is generated.

Therefore, the scanning type optical apparatus is conventionally provided therein with means for correcting the curve of the scanning line. As shown in FIG. 6(b), there is used a technique for adjust the colors such that in accordance with one of colors having greatest curving amount, other three colors are adjusted so that the scanning lines of all of the four colors are superposed. The following conventional correcting method of a scanning line curve has been proposed.

Japanese Patent Application Laid-open No. H10-268217 describes a method in which a curve adjusting method bends a plastic lens, thereby the curve of the scanning line. According to the method using the plastic lens however, if the temperature of the optical apparatus rises, the optical characteristics of the plastic lens are varied, and the correcting degree of the curve of the scanning line is varied and this is not preferable.

There is another method for correcting the color deviation by curving a reflection surface of a recording material having small variation in external factor.

Japanese Patent Application Laid-open No. H8-146325 describes a structure in which opposite ends of a flat reflection mirror are pushed by springs, the mirror is curved by variable pressing means which is provided on a central portion of the mirror, and the curve of the scanning line is corrected. Japanese Patent Application Laid-open No. 2001-117040 describes a structure in which reflection surface sides of a mirror are supported by a pair of brackets, a back side of a portion of the mirror projected outward from the bracket is supported by an adjustment screw, and the mirror is curved by the adjustment screw.

In a conventional scanning type optical apparatus using the technique which corrects a curve of the scanning line by curving the reflection r, an optical box in which an optic such as the reflection mirror is accommodated is provided with a seat surface for supporting the reflection mirror. A shape of a portion of the seat surface which comes into contact with the reflection mirror and supports the same is flat in shape as shown in FIG. 7(a).

Figure 7:
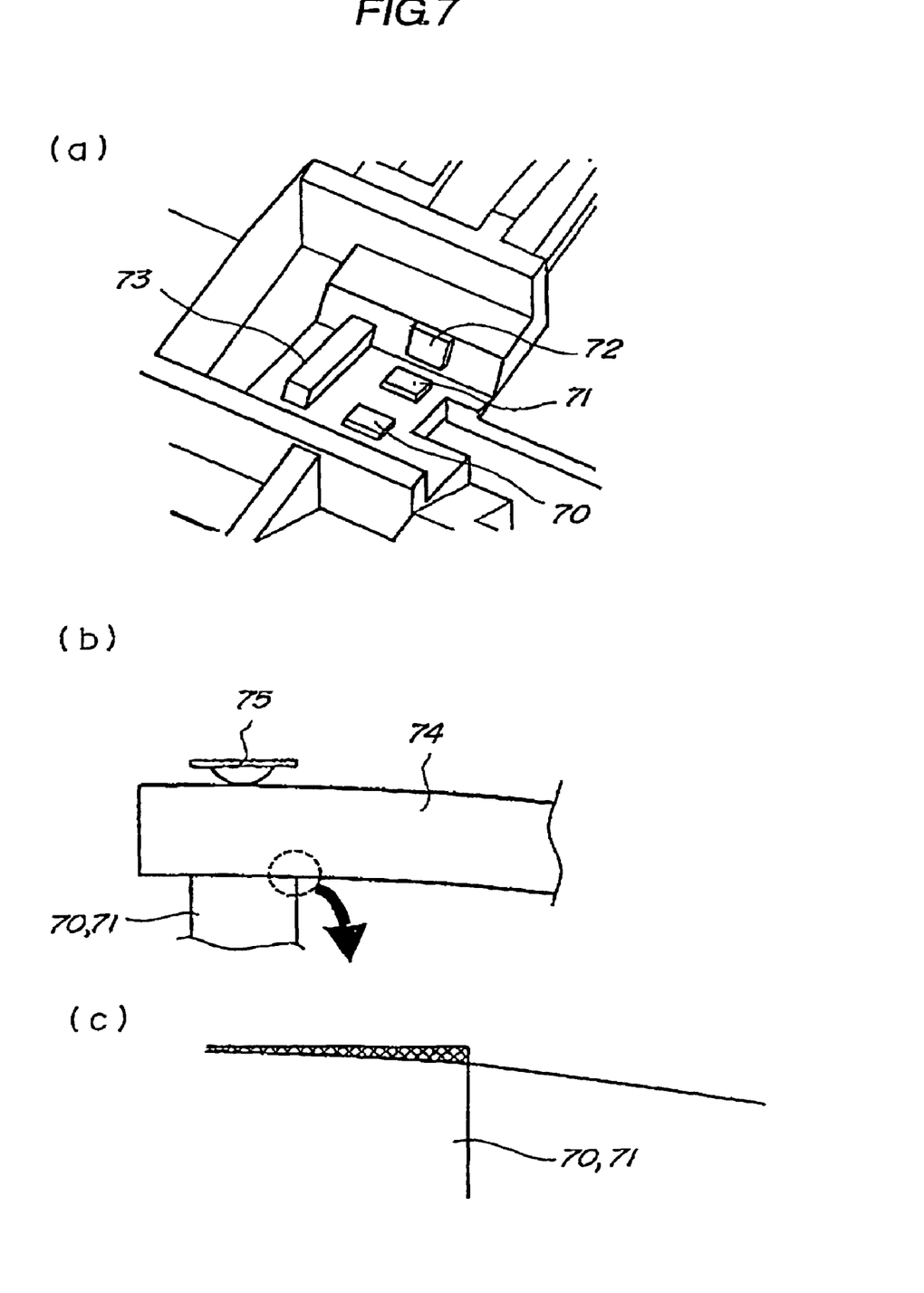

FIG. 7(a) is an enlarged view of a portion of the optical box on which the mirror is placed. The reflection angle of the mirror is defined by abutting the mirror against seat surfaces 70, 71 and 72, and a position of the mirror in its longitudinal direction is defined by abutting an end of the mirror in the longitudinal direction against an abutment portion 73.

FIG. 7(b) is an enlarged view of the seat surface which supports the reflection mirror to be curved. A curved mirror 74 is supported by seat surfaces 70 and 71 of an optical box and by a spring 75 which pushes the mirror 74 against the seat surfaces 70 and 71. FIG. 7(c) is a further enlarged view of an edge (portion surrounded by broken line in FIG. 7(b)) formed in the optical box. As can be found also in FIG. 7(c), when the mirror is curved, angle portions of the seat surfaces 70 and 71 formed in the optical box interfere with the ideal curved shape of the mirror in a region shown with hatching.

As described above, the seat surface portion and the reflection mirror interfere with each other depending upon the shape of the seat surface in a direction in which the reflection mirror is curved and with this, the mirror is newly deformed locally in the vicinity of the seat surface, and there is an adverse possibility that the optical characteristics of the mirror are deteriorated from the support portion of the reflection mirror toward the reflection surface.

That is, this is because that if the seat surface is of flat shape while the reflection mirror is curved, interference with the edge by the flat shape of the seat surface is generated.

Further, if the receiving portion of the reflection mirror surface on the side of the direction in which the reflection mirror is curved is of flat shape, deviation in relative support angle is generated in terms of working at the support portions of the opposite ends formed on the opposite ends of the reflection mirror in some cases. This is because the support portions of the opposite ends are flat. The reflection mirror is placed at each support portion with an angle along a ridgeline of each seat surface, but the angle of the seat surface of opposite ends is varied within a range of tolerances, the angles of reflection mirrors to be placed are different on the opposite ends. Therefore, the reflection mirror is twisted when the seat surface is flat and as a result, the optical characteristics are further deteriorated.

SUMMARY OF THE INVENTION

It is an object of the present invention to reduce new deformation generated by interference of a contact portion which comes into contact with a reflection member because of curve even if the reflection surface is curved.

It is another object of the invention to provide an optical apparatus comprising: a first image bearing member; a second image bearing member; a first reflection member for reflecting deflection-scanned first laser beam toward the first image bearing member; a second reflection member for reflecting deflection-scanned second laser beam toward the second image bearing member; and curving support means for curving, in a reflection direction, a reflection surface which reflects the laser beam of the first reflection means, wherein the curving support means includes a support portion which supports a surface on the side of a direction in which the first reflection member curves, a contact portion of the support portion with respect to the first reflection member is of a shape having a curvature.

Other objects of the invention will be apparent from the following explanation.

BRIEF DESCRIPTION OF DRAWINGS

FIGS 1(a) and (b) are diagrams used for explaining a seat surface on which a reflection mirror of a first embodiment is placed;

FIGS 2(a) and (b) are diagrams used for explaining seat surfaces of the reflection mirror and an optical box of the first embodiment;

FIGS. 5(a), (b), and (c) are diagrams used for explaining a seat surface on which a reflection mirror of a second embodiment is placed;

FIGS. 6(a) and (b) are diagrams used for explaining color deviation and correction of the color deviation; and FIGS. 7(a), (b), and (c) are diagrams used for explaining a seat surface which supports a reflection mirror at an optical box according to a conventional technique.

DETAILED DESCRIPTION OF THE PREFERRED EMBODIMENTS

Next, an image forming apparatus having an optical apparatus according to embodiments of the invention will be explained with reference to the drawings.

[First Embodiment]

An image forming apparatus of a first embodiment will be explained with reference to FIGS. 1 to 4.

(Entire Structure of Image Forming Apparatus)

Figure 3:
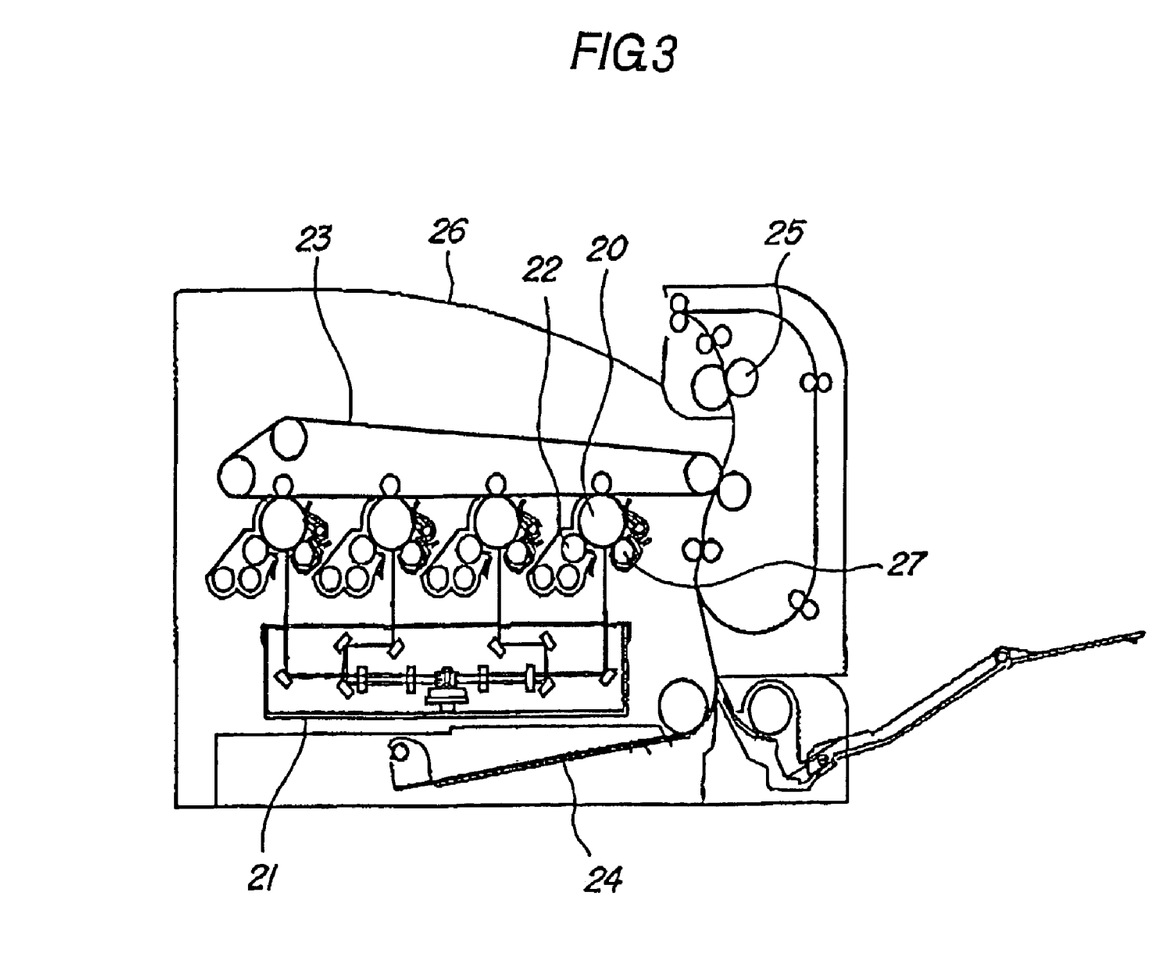
FIG. 3 is a diagram used for explaining a scanning type optical apparatus.
Figure 4:
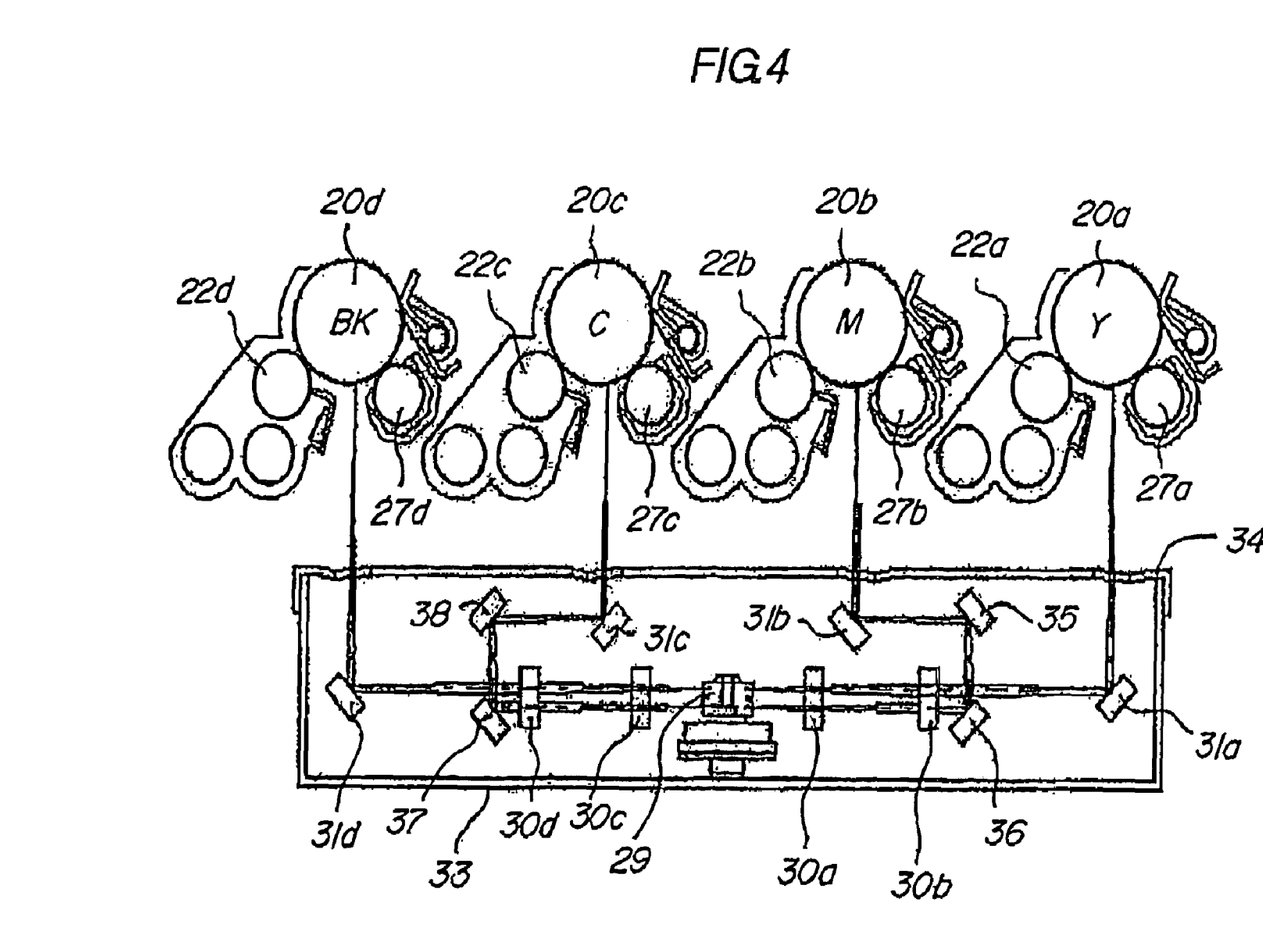
FIG. 4 is a diagram used for explaining the scanning type optical apparatus.

Referring to FIGS. 3 and 4, the entire structure of the image forming apparatus will be explained. FIG. 3 is a schematic explanatory view of the entire image forming apparatus. FIG. 4 is an explanatory view of a scanning type optical apparatus.

The image forming apparatus of this embodiment has four photosensitive drums 20 as image bearing members arranged side-by-side. In this embodiment, a yellow image is formed on a photosensitive drum 20a which is a first image bearing member, a magenta image is formed on a photosensitive drum 20b which is a second image bearing member, a cyan image is formed on a photosensitive drum 20c which is a third image bearing member, and a black image is formed on a photosensitive drum 20d which is a fourth image bearing member. The yellow, magenta, cyan and black toner images formed on the respective photosensitive drums are superposed on a transfer material such as an intermediate transfer material, thereby forming a color image. The photosensitive drum 20 comprises a conductor member on which a photosensitive layer is applied. Electrostatic latent images corresponding to respective color images are formed on the photosensitive drum charged by a charging roller 27 which is a charging member by laser beam emitted from the scanning type optical apparatus.

A reference number 21 represents the scanning type optical apparatus which emits laser beam based on image information sent from an image reader or personal computer. Reference numbers 22a to 22d represent development units as development means which form toner image on the photosensitive drum. A reference number 23 represents an intermediate transfer belt as a transfer material for transferring the toner image on the photosensitive drum onto a transfer sheet.

A reference number 24 represents a supply cassette accommodating therein sheets as recording materials on which toner image is formed. A reference number 25 represents a fig device as fixing means for heat-fixing the toner image transferred on the sheet. A reference number 26 represents a discharge tray on which the fixed transferred sheet is placed.

The photosensitive drum is irradiated with laser beam based on the image information from the scanning type optical apparatus 21, electrostatic latent images of respective colors are formed on the photosensitive drums 20a to 20d charged by the chargers 27a to 27d, thereby forming an image.

Then, toner which was frictionally charged in the development units 22a to 22d is adhered to the electrostatic latent image and with this, toner images of respective colors are formed on the photosensitive drums 20a to 20d. The toner images are superposed on and transferred to the intermediate transfer belt 23 from the photosensitive drum 20, and a color image is formed.

In synchronization with the image formation, the toner image on the intermediate transfer belt 23 is transferred on a sheet conveyed from the supply cassette 24 provided in a lower portion of a body, thereby forming an image on the sheet. Toner is fixed on the image transferred on the sheet by the fixing device 25, and is placed on the discharge tray 26.

As shown in FIG. 4, the scanning type optical apparatus 21 emits laser beam to the photosensitive drum 20 through a rotary polygon mirror 29 which is a rotatable rotary polygon mirror for deflection-scanning laser beam emitted by the light source based on image information, fθ lenses 30a, 30b, 30c, 30d for equal speed scanning laser beam and for spot-forming an image on the drum, and a reflection mirror 31 which is a reflection member for reflecting beam in a predetermined direction, thereby forming an electrostatic latent image. In this embodiment, a reflection mirror 31a is provided as a first reflection member, a reflection mirror 31b is provided as a second reflection member, a reflection mirror 31c is provided as a third reflection member, and a reflection mirror 31d is provided as a fourth reflection member. In this embodiment, the mirrors 31a to 31d which emit light to the photosensitive drum can be curved. Structures for curving the mirrors 31a to 31d are the same and thus, a structure for curving the first mirror will be explained.

In this embodiment, the last mirror which emits light to the photosensitive drum can be curved, but any mirror but the last one, e.g., any of the mirrors 35 to 38 may be curved.

In this embodiment, laser beam emitted from the light source which emits laser beam diagonally enters the reflection surface of the rotary polygon mirror.

All of optics such as the reflection mirror are accommodated in the optical box 33 which is an optical frame in this embodiment, and the optics are mounted on the optical box 33 using screw or spring. Since the scanning type optical apparatus 21 is dust-sensitive, an upper lid 34 is mounted to hermetically close the scanning type optical apparatus 21.

[Reflection Mirror Support Seat Surface]

A seat surface shape for supporting the reflection mirror 31 will be explained with reference to FIGS. 1 and 2.

Figure 1:
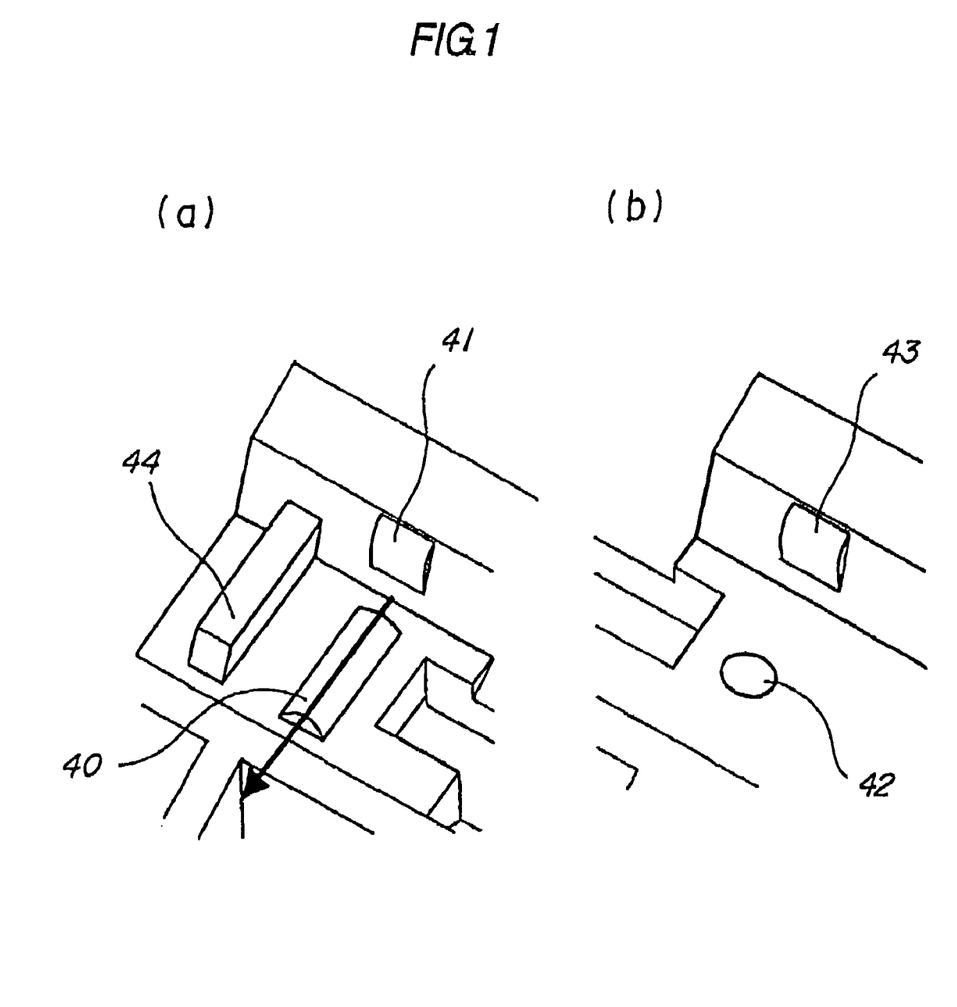
Figure 2:
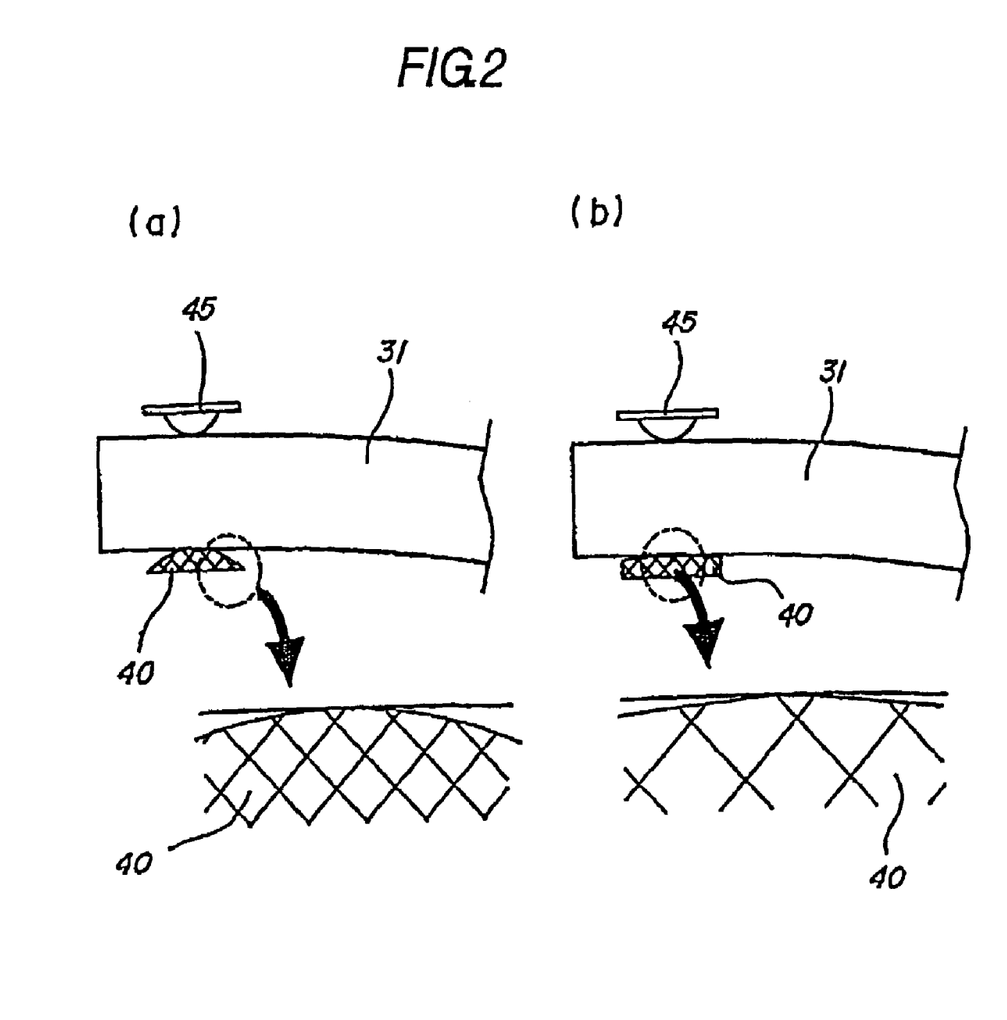

FIG. 1 is a perspective explanatory view of the seat surface which supports the reflection mirror. FIG. 2 is a sectional explanatory view showing the reflection mirror and the seat surface.

FIG. 1(a) shows a seat surface which supports one end (left end in the embodiment) of the reflection mirror 31 in its longitudinal direction, and FIG. 1(b) shows a seat surface which supports the other end (right end in this embodiment) of the reflection mirror 31. In FIG. 1, reference numbers 40 to 43 show seat surfaces to which the reflection mirror 31 comes into contact. A reference number 44 represents an abutment portion 44 against which the end of the reflection mirror 31 in its longitudinal direction is abutted to define the position of the end. The seat surfaces 40, 41, 42 and 43 are formed into shapes having curvatures.

The shape of the seat surface will be explained more concretely. The seat surfaces 40 and 41 which support the left end of the reflection mirror 31 in the longitudinal direction are of semi-columnar shape. The seat surface 40 which supports a lower surface of the reflection mirror 31 is of the semi-columnar shape extending in a direction intersecting with a scanning direction (simply "scanning direction" hereinafter) of laser beam by the rotary polygon mirror 29, and has a curvature with respect to the longitudinal direction of the reflection mirror 31. The seat surface 41 against which an upper end side of the reflection mirror 31 is abutted is formed into the semi-columnar shape extending in the scanning direction.

The seat surface 42 which supports a lower surface of the right end of the reflection mirror 31 in the longitudinal direction is formed into a semi-spherical shape. The seat surface 43 against which the upper end side of the reflection mirror 31 is abutted is formed into a semi-columnar shape extending in the scanning direction like the seat surface 41.

As described, in this embodiment, a direction into which laser enters and is reflected is called curving direction, and the support portions 40 and 42 of portions of the curving support means which supports the surface on the side of the curving direction have contact portions with respect to the mirror, and the contact portions have curvatures.

When the reflection mirror 31 is mounted on the optical box 33, its left end is supported substantially linearly at an angle along the ridgeline of the semi-columnar seat surface of the seat surface 40, and its right side follows the angle by the semi-spherical seat surface 42 and is supported substantially at point. As shown in FIG. 2(a), the reflection mirror 31 is pushed against and supported by the support portions 40 and 42 by springs 45 (only one of them is illustrated in FIG. 2) provided on an upper surface corresponding to the support portions 40 and 42.

In this embodiment, the curving support means supports the mirror and curves the same. The curving support means comprises the receiving support portions 40 and 42 and a pressing portion 45. These supporting and curving operations are carried out at an end out from the image forming region.

As described above, the reflection mirror 31 is placed along the ridgeline of the seat surface 40. The disposition angle of the reflection mirror 31 at that time is defined by an angle along the ridgeline of the semi-columnar seat surface 40. The other semi-spherical seat surface 42 abuts against the reflection mirror 31 at a position along the angle and thus, the reflection mirror is not twisted. Thus, it is possible to mount the reflection mirror 31 on the optical box 33 without deteriorating the optical characteristics.

The curving support means pushes a predetermined position of the reflection mirror 31, thereby curving the reflection mirror 31, and corrects the curve of the scanning line.

Here, a relation between the seat surface and the mirror when the reflection mirror 31 is curved by the curving support means and the scanning line is curved will be explained with reference to FIG. 2(a). Although the seat surface 40 which supports the left end of the reflection mirror 31 in the longitudinal direction will be explained in FIG. 2(a), the seat surface 42 which supports the right end is the same.

In this embodiment, as shown in FIG. 2(a), the seat surface 40 is provided with the curvature in a direction in which the reflection mirror 31 is curved. This prevents a case in which a profile of the reflection mirror 31 when it is curved comes into contact with the end of the seat surface 40 and is locally changed, and optical performance on the end of the reflection mirror 31 is largely deteriorated.

As can be seen in the enlarged view of FIG. 2(a), in this embodiment, the radius of curvature of the reflection mirror 31 in the vicinity of the seat surface 40 is larger than the radius of curvature of the seat surface 40. With this, the profile of the reflection mirror 31 and the end of the seat surface 40 do not interfere with each other, and the reflection surface can be maintained excellently. If the radius of curvature of the seat surface 40 is larger on the contrary, the seat surface 40 comes into contact with the profile of the reflection mirror 31, and the above-described effect can not be obtained.

It is not always necessary that the seat surface which supports the reflection mirror 31 has circular cross section. If the reflection mirror 31 has a curvature smaller than the radius of curvature in the vicinity of the seat surface when the reflection mirror 31 is curved, the shape of the seat surface may be oval shape and the same effect can be obtained.

As shown in FIG. 2(b), the support portions 40 and 42 may be triangular in shape and may support the reflection mirror 31 at the ridgeline. Even with this structure, the above-described performance can of course be obtained like the seat surface having the curvature.

In this embodiment, the reflection mirror 31 is pushed at a location closer to the left side than the central portion in the longitudinal direction, thereby curving the reflection mirror 31. Therefore, the seat surface 40 is closer to the curving support means (first seat surface), and the seat surface 42 is further from the curving support means (second seat surface).

It is preferable that a location where the curving support means is provided for curving the reflection mirror is closer to the seat surface formed with the semi-columnar seat surface 40. This is because a large force for curving the reflection mirror 31 is generated in the seat surface of the optical box 33, and if the curving support means is provided on the side of the semi-columnar seat surface 40, the stress generated in the seat surface of the optical box 33 can be dispersed.

As described above, in the optical apparatus of the embodiment, the seat surface shape for placing the reflection mirror 31 is formed of the semi-columnar seat surface 40 and the spherical seat surface 42. This prevents the mirror from being twisted. When the apparatus has the curving support means which corrects the curve of the scanning line by the reflection mirror 31, the profile of the reflection mirror 31 can excellently be maintained even in the vicinity of the seat surface. If the curve adjustment means is provided on the side of the seat surface, the stress generated in the seat surface of the optical box 33 can be dispersed.

In this embodiment, the optical box is integrally provided with a support member. Even if the support member is detachably mounted, the same effect can be obtained of course.

As described above, even if the reflection surface is curved by the present invention, new deformation generated by the interference of the contact portion which comes into contact with the reflection member due to the curve can be reduced.

[Second Embodiment]

Figure 5:
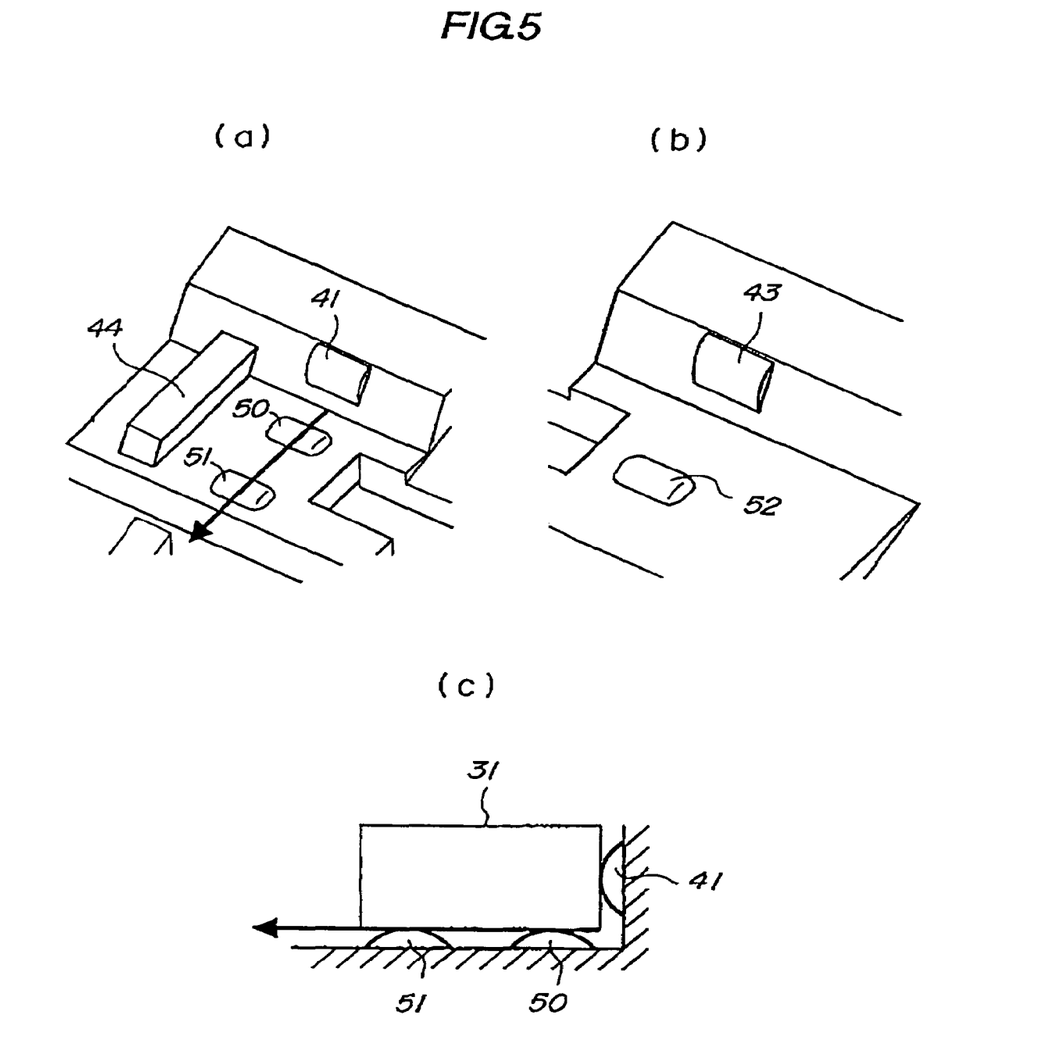

Next, an apparatus according to a second embodiment will be explained with reference to FIGS. 5. FIGS. 5(a)–(c) are explanatory views of a seat surface which supports a reflection mirror of the second embodiment. FIG. 5(a) shows a seat surface which supports a left end of the reflection mirror in its longitudinal direction, FIG. 5(b) shows a seat surface which supports a right end of the reflection mirror in its longitudinal direction, and FIG. 5(c) shows a cross section of the seat surface which supports the left end of the reflection mirror.

In the second embodiment, only the shape of the seat surface is different from the first embodiment, and other structures are the same as those of the first embodiment. Therefore, redundant explanation is omitted, and only a characteristic structure of this embodiment will be explained. Members having the same functions as those of the first embodiment are designated with the same reference numbers.

In this embodiment, as shown in FIGS. 5(a) and (b), three semi-columnar seat surfaces, i.e., two seat surfaces 50 and 51 which support a left end of a mirror closer to the curving support means and one seat surface 52 which supports a right end of a mirror further from the curving support means support the reflection surface of the reflection mirror. Any of the three seat surfaces 50 to 52 is formed into the semi-columnar shape extending in the scanning direction.

In the above structure, the reflection mirror 31 to be placed can define an angle in which the reflection mirror 31 is placed on the side where it is supported at two points shown in FIG. 5(c).

FIG. 5(c) shows a cross section of the seat surface on the side where the reflection mirror 31 is supported at the two points. The reflection mirror 31 is supported at two points (seat surfaces 50 and 51) on the side of the reflection surface, and at one point (seat surface 41) on the side intersecting with the reflection surface. As can be seen from the drawing, the placing angle of the reflection mirror 31 is defined along the tangent (in the direction shown with arrow) of the two point semi-columnar seat surfaces 50 and 51 formed in the optical box.

Since the opposed seat surface 52 is one semi-columnar seat surface, the grounding surface of the opposed side of the reflection mirror 31 comes into contact on the opposed side when it is disposed along the tangent direction. According to this embodiment, the reflection mirror 31 can be placed on the seat surface of the optical box without twisting the reflection mirror 31.

The seat surfaces 50 to 52 have curvatures also in the longitudinal direction of the reflection mirror 31 like the first embodiment. The curvatures are provided for the same purpose as that of the first embodiment, and this prevents a case in which a profile of the reflection mirror 31 when it is curved comes into contact with the ends of the seat surfaces 50 to 52 and is locally changed, and optical performance on the end of the reflection mirror 31 is largely deteriorated.

Therefore, like the first embodiment, the radius of curvature is set smaller than that of the reflection mirror 31. With this, the profile of the reflection mirror 31 and the seat surface of the optical box 33 do not interfere with each other when the curve of the reflection mirror 31 is adjusted, and excellent optical performance can be maintained also in the vicinity of the seat surface. Further, of the three points, i.e., the semi-columnar seat surfaces 50 to 52, the two seat surfaces 50 and 51 are provided closer to the curve adjustment means. With this, a load received by the optical box 33 can be dispersed when the curve is adjusted.

Concerning the shapes of the seat surfaces 50 to 52 formed with the optical box, if the curvature provided on the end of the reflection mirror 31 in the longitudinal direction is smaller than that of the radius of curvature in the vicinity of the seat surface when the reflection mirror 31 is curved, the same effect can be obtained even if the seat surface has another shape such as oval shape like the first embodiment.

In the embodiment, the one seat surface 52 which supports the right end further from the curve adjustment means is formed into the semi-columnar shape extending in the scanning direction, but the seat surface 52 may be formed into a semi-spherical shape as in the first embodiment.

[Another Embodiment]

In any of the above embodiments, the terms "semi-columnar shape" and "semi-spherical shape" of the seat surface mean partial shape of the semi-columnar shape and the semi-spherical shape, and do not mean shape obtained by dividing a columnar or sphere into half.

Although the embodiments of the present invention have been described above, the invention is not limited to these embodiments, and the invention can variously be modified within a technical idea.

CROSS-REFERENCE TO RELATED APPLICATION

This application claims the benefit of priority from the prior Japanese Patent Application No. 2004-166900(Pat.) filed on Jun. 4, 2004, the entire contents of which are incorporated herein by reference.

The invention claimed is:

1. An optical apparatus comprising:
   a first image bearing member;
   a second image bearing member;
   a first reflection member for reflecting a deflection-scanned first laser beam toward said first image bearing member;

a second reflection member for reflecting a deflection-scanned second laser beam toward said second image bearing member; and curving support means for curving, in a reflection direction, a reflection surface of said first reflection member, which reflects the first laser beam, wherein said curving support means includes a support portion which supports a surface on the side of a direction in which said first reflection member curves, a contact portion of said support portion with respect to said first reflection member is of a shape having a curvature.

2. The optical apparatus according to claim 1, further comprising:

second curving support means for curving, in a reflection direction, a reflection surface of said second reflection member, which reflects the second laser beam, wherein said second curving support means includes a second support portion which supports a surface on the side of a direction in which said second reflection member curves, a contact portion of said second support portion with respect to said second reflection member is of a shape having a curvature.

3. The optical apparatus according to claim 1, further comprising a rotary polygon mirror for deflection-scanning the first laser beam, wherein the first laser beam diagonally enters a reflection surface of said rotary polygon mirror.

4. The optical apparatus according to claim 3, wherein the second laser beam diagonally enters the reflection surface of said rotary polygon mirror.

5. The optical apparatus according to claim 1, further comprising an optical frame including a light source for emitting the first laser beam and a rotary polygon mirror for deflection-scanning the first laser beam, wherein the optical frame is integrally provided with a portion of the support portion of said curving support means.

6. The optical apparatus according to claim 1, wherein the support portion of said curving support means supports at an end of the surface of said first reflection member.

7. The optical apparatus according to claim 1, wherein the support portion having said curvature is of semi-columnar shape.

8. The optical apparatus according to claim 1, wherein the support portion having said curvature is of semi-spherical shape.

* * * * *

UNITED STATES PATENT AND TRADEMARK OFFICE
CERTIFICATE OF CORRECTION

PATENT NO. : 7,199,913 B2 Page 1 of 1
APPLICATION NO. : 11/143732
DATED : April 3, 2007
INVENTOR(S) : Hiroshi Nakahata It is certified that error appears in the above-identified patent and that said Letters Patent is hereby corrected as shown below:

COLUMN 1:
Line 61, "adjust" should read --adjusting--.

COLUMN 2:
Line 23, "r," should read --mirror,--.
Line 53, "that" should be deleted.

COLUMN 3:
Line 28, "FIGS" should read --FIGS.--.
Line 31, "FIGS" should read --FIGS.--.

COLUMN 4:
Line 28, "fig" should read --fixing--.

COLUMN 6:
Line 49, "has" should read --have--.

COLUMN 7:
Line 2, "is" (second occurrence) should read --be--.

Signed and Sealed this

Sixth Day of May, 2008

JON W. DUDAS
*Director of the United States Patent and Trademark Office*